United States Patent [19]

Nakamura

[11] Patent Number: 4,791,625
[45] Date of Patent: Dec. 13, 1988

[54] OPTICAL PICKUP DEVICE USING AN INTERMEDIATE LENS WHICH SLIGHTLY CONVERGES THE LIGHT BEAM

[75] Inventor: Akira Nakamura, Kanagawa, Japan

[73] Assignee: Sony Corporation, Tokyo, Japan

[21] Appl. No.: 95,021

[22] Filed: Sep. 10, 1987

[30] Foreign Application Priority Data

Sep. 18, 1986 [JP] Japan .............................. 61-220311

[51] Int. Cl.$^4$ ............................................ G11B 7/125
[52] U.S. Cl. ...................................... 369/112; 369/44; 369/122
[58] Field of Search .................................. 369/43–95, 369/112, 122

[56] References Cited

U.S. PATENT DOCUMENTS 4,411,500 10/1983 Yonezawa et al. .................. 369/122
4,610,515 9/1986 Tanaka .................................. 369/112

FOREIGN PATENT DOCUMENTS 0029755 6/1981 European Pat. Off. .............. 369/45

Primary Examiner—Raymond F. Cardillo
Assistant Examiner—James E. Tomassini
Attorney, Agent, or Firm—Lewis H. Eslinger

[57] ABSTRACT

An optical pickup device comprises a light beam source, an objective lens system for causing a light beam emitted from the light beam source to impinge upon a record medium and for receiving a reflected light beam from the record medium, and intermediate lens system composed of a single lens element for causing the light beam emitted from the light beam source to be slightly converged and to enter into the objective lens system and for receiving the reflected light beam transmitted through the objective lens system. A beam splitter separates the reflected light beam transmitted through the objective lens system and the intermediate lens system from the light beam emitted from the light beam source, and a photodetector detects the reflected light beam separated by the beam splitter. Spherical aberration induced by the intermediate lens system in the light beam passing through the intermediate lens system and the objective lens system to the record medium is cancelled at the objective lens system.

4 Claims, 3 Drawing Sheets

OPTICAL PICKUP DEVICE USING AN INTERMEDIATE LENS WHICH SLIGHTLY CONVERGES THE LIGHT BEAM

BACKGROUND OF THE INVENTION

1. Field of the Invention

The present invention relates to optical pickup devices for reading information signals from record media and, more particularly, to an optical pickup device operative to cause a light beam to impinge upon a record medium through an objective lens system and guide a reflected light beam coming from the record medium through the objective lens system to a photodetector, so as to obtain from the photodetector an output signal representing information read from the record medium.

2. Description of the Prior Art

In an optical disc player for optically reproducing an information signal recorded on a disc-shaped record medium, it is necessary to provide an optical pickup device for reading the information signal from a record track formed on the disc-shaped record medium.

An example of a previously proposed optical pickup device is shown in FIG. 1. The device is a semiconductor laser 1, an objective lens system 4, a photodetector 6 and other optical elements. The device is mounted on the optical disc player to be movable along a radius of a disc D which is loaded on the optical disc player and provided with, for example, a spiral record track. In the optical pick-up shown in FIG. 1, a laser light beam from the semiconductor laser 1 passes through a beam splitter 2 without being deflected thereat and then enters into a collimating lens system 3 to be collimated thereby. The laser light beam having passed through the collimating lens system 3 is focused by the objective lens system 4 to impinge upon the disc D so as to be modulated in intensity and reflected at the spiral record track on the disc D to be a reflected laser light beam.

The reflected laser light beam from the disc D passes through the objective lens system 4 and the collimating lens system 3 to the beam splitter 2 and is deflected at the beam splitter 2 so as to pass to the photodetector 6 through a light receiving lens system (a concave and cylindrical lens system) 5. The photodetector 6 detects the reflected laser light beam from the disc D to produce detection output signals varying in response to variations in the reflected light beam. The detection output signals obtained from the photodetector 6 are supplied to a signal processing circuit (not shown in the drawings) in which a reproduced information signal, focusing control signal and tracking control signal are produced. The focus control signal and tracking control signal are supplied to a lens driving unit 7 for focus control and a lens driving unit 8 for tracking control both disposed in relation to the objective lens system 4, respectively, so that a focus servo control and a tracking servo control are performed.

In the optical pickup device described above, the collimating lens system 3 by which the laser light beam from the semiconductor laser 1 is collimated to enter into the objective lens system 4 is composed of a set of concave lens element 3a and convex lens element 3b bonded together, so that the spherical aberration induced in the laser light beam passing through the collimating lens system 3 is diminished.

FIG. 2 shows schematically another example of a previously proposed optical pickup device employed in the optical disc player. The optical pickup device shown in FIG. 2 is a modification of the optical pickup device shown in FIG. 1 wherein a collimating lens system 10 is provided in place of the collimating lens system 3 shown in FIG. 1. In the optical pickup device shown in FIG. 2, the collimating lens system 10 is composed of a single convex lens element and therefore may be easily produced at reduced cost.

In the case of the previously proposed optical pickup device shown in FIG. 1 in which the collimating lens system 3 composed of a combination of the concave and convex lens elements 3a and 3b is employed so that the spherical aberration induced in the laser light beam passing through the collimating lens system 3 is diminished, a costly and time-consuming process is required for polishing four different lens surfaces including a pair of opposite outer surfaces of the concave lens element 3a and another pair of opposite outer surfaces of the convex lens element 3b, processing a peripheral portion of each of the concave lens element 3a and the convex lens element 3b, positioning both of the concave lens element 3a and the convex lens element 3b precisely in a predetermined mutual relation, and bonding the concave lens element 3a and the convex lens element 3b together precisely, in production of the collimating lens system 3. Therefore, there is a disadvantage that production cost of the collimating lens system 3 is increased.

On the other hand, in the case of the previously proposed optical pickup device shown in FIG. 2 in which the collimating lens system 10 composed of the single convex lens element so as to be easily produced at reduced production cost is employed, there is a defect that a relatively large spherical aberration is induced in the laser light beam passing through the collimating lens system 10 and therefore the laser light beam collimated by the collimating lens system 10 is apt to have a large wave front aberration. For example, FIG. 3 shows a relationship between the length (L) of an optical path from a principal plane of the single convex lens element constituting the collimating lens system 10 to a light emitting point in a semiconductor laser 1 and the wave front aberration (Ab) of the laser light beam at a spot formed on the disc D by the laser light beam, wherein Lf represents a focal distance of the single convex lens element. It is understood from this relationship that when the single convex lens element is so located that the principal plane of the single convex lens element is distant by the focal distance Lf from the light emitting point of the semiconductor laser 1 along the optical path from the principal plane of the single convex lens element to the light emitting point in the semiconductor laser 1, that is, the length (L) of the optical path is selected to be identical with the focal distance Lf, the wave front aberration (Ab) is of substantial size. In the case where the wave front aberration (Ab) of the laser light beam at the spot formed on the disc D by the laser light beam is of substantial size as described above, the optical characteristics of the optical pickup device employing the collimating lens system 10 deteriorate, for example in an information reading operation.

OBJECTS AND SUMMARY OF THE INVENTION

Accordingly, it is an object of the present invention to provide an optical pickup device employing an intermediate lens system disposed on an optical path between a light beam source and an objective lens system for causing a light beam from the light beam source to enter into the objective lens system, which avoids the aforementioned problems encountered with the prior art.

Another object of the present invention is to provide an improved optical pickup device employing an intermediate lens system which is disposed on an optical path between a light beam source and an objective lens system for causing a light beam from the light beam source to enter into the objective lens system so that the light beam from the light beam source is focused properly by the objective lens system to impinge upon a record medium, and by which a wave front aberration induced in the light beam passing through the objective lens system to the record medium is sufficiently diminished as not to cause deterioration of the optical characteristics of the device, for example in an information reading operation.

A further object of the present invention is to provide an improved optical pickup device employing an intermediate lens system which is disposed on an optical path between a light beam source and an objective lens system for causing a light beam from the light beam source to enter into the objective lens system so that the light beam from the light beam source is focused properly by the objective lens system to impinge upon a record medium, and can be easily produced at reduced cost, and by which a wave front aberration brought on the light beam passing through the objective lens system to the record medium is sufficiently diminished.

According to the present invention, there is provided an optical pickup device comprising a light beam source, an objective lens system for focusing a light beam from the light beam source to cause the same to impinge upon a record medium and receiving a reflected light beam coming from the record medium, an intermediate lens system composed of a single lens element for causing the light beam emitted from the light beam source to be converged slightly as compared with a parallel light beam and enter into the objective lens system, so that spherical aberration induced by the intermediate lens system in the light beam passing through the intermediate lens system and the objective lens system is cancelled at the objective lens system, and receiving the reflected light beam having passed through the objective lens means, a beam splitter for separating the reflected light beam having passed through both the objective lens system and the intermediate lens system, and a photodetector for detecting the reflected light beam having passed through the beam splitter.

In the optical pickup device thus constituted in accordance with the present invention, the beam splitter and the intermediate lens system composed of the single lens element are provided in the light path between the light beam source formed with a semiconductor laser or the like and the objective lens system, and the light beam from the light beam source passes through the beam splitter to the intermediate lens system and is focused by the intermediate lens system to be slightly converged as compared with a parallel light beam and to enter into the objective lens system. The light beam having passed through the intermediate lens system is focused sufficiently by the objective lens system to impinge upon the record medium. In such an arrangement, the light beam entering into the objective lens system is converged by the intermediate lens system so slightly as to be focused by the objective lens system in substantially the same manner as the parallel light beam and to be subjected to cancellation of the spherical aberration induced therein by the intermediate lens system at the objective lens system. Accordingly, the fact that the slightly converged light beam enters into the objective lens system to be focused thereby exerts substantially no harmful influence upon the optical characteristics of the device during an information reading operation, but on the contrary causes the light beam impinging upon the recording medium to have a reduced spherical aberration.

The reflected light beam from the record medium passes through the objective lens system and the intermediate lens system to the beam splitter, and is guided by the beam splitter to the photodetector so that a detection output signal representing information read from the record medium is obtained from the photodetector.

In such an optical pickup device according to the present invention, the intermediate lens system is composed of the single lens element and therefore can be easily and quickly produced at reduced cost in a process that does not require much skill. Further, as a result of the fact that the light beam from the light beam source is focused by the intermediate lens system so as to be converged slightly as compared with the parallel light beam and enter into the objective lens system, a wave front aberration of the light beam passing through the intermediate lens system and the objective lens system to the record medium is sufficiently diminished that the optical characteristics of the device are not deteriorated even though the intermediate lens system is composed of the single lens element.

The above and other objects, features and advantages of the present invention will become apparent from the following detailed description which is to be read in conjunction with the accompanying drawings.

DESCRIPTION OF THE PREFERRED EMBODIMENT

The invention will now be described by way of example with reference to the accompanying drawings.

Figure 4:
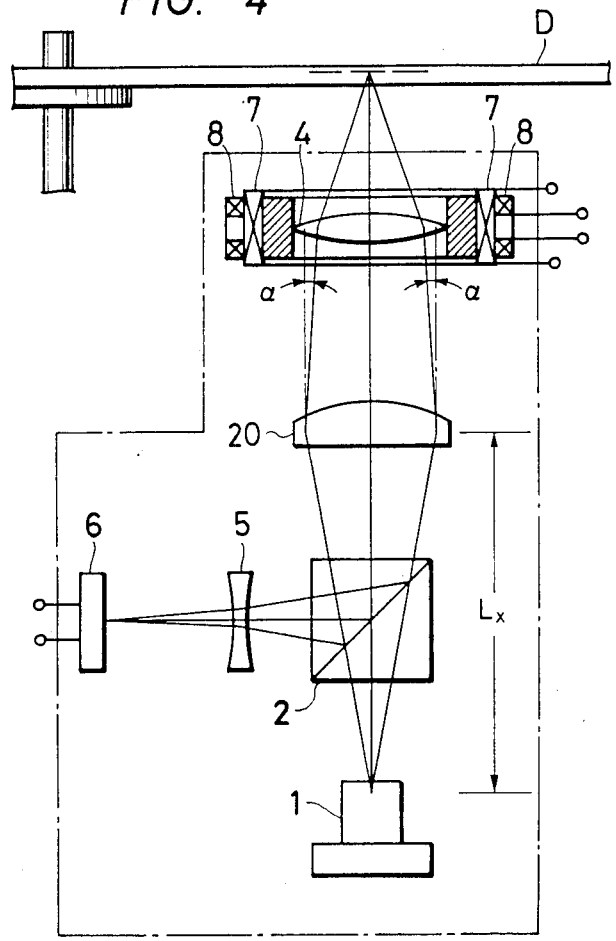
FIG. 4 is a schematic illustration showing one embodiment of optical pickup device according to the present invention.

FIG. 4 shows one embodiment of optical pickup device according to the present invention.

Figure 1:
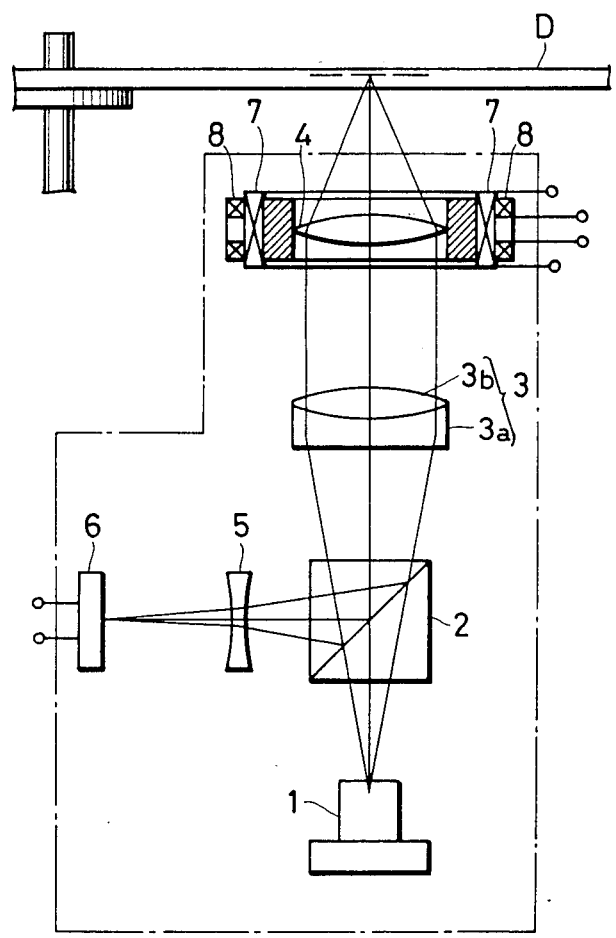
FIG. 1 is a schematic illustration showing an optical pickup device proposed previously.
Figure 2:
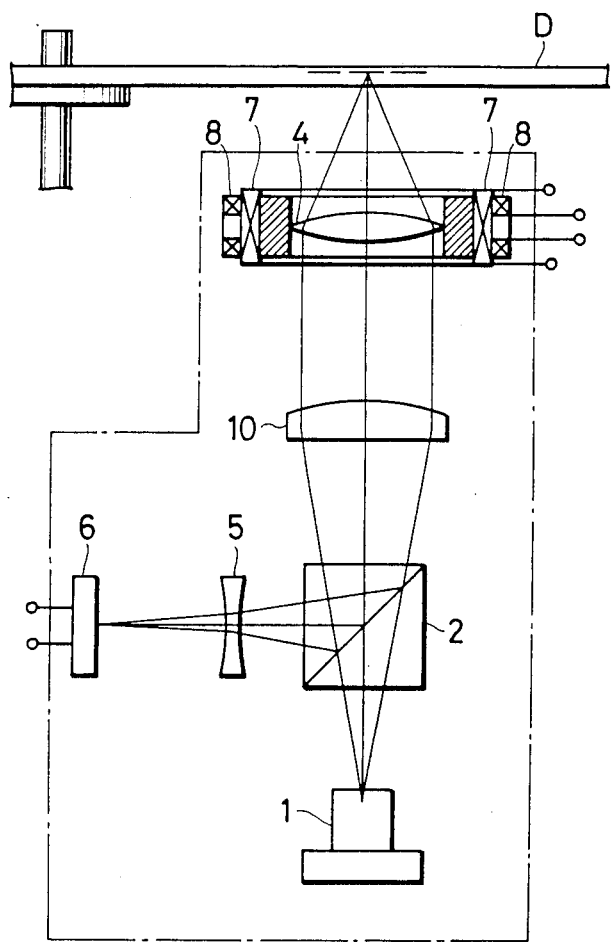
FIG. 2 is a schematic illustration showing another optical pickup device proposed previously.
Figure 3:
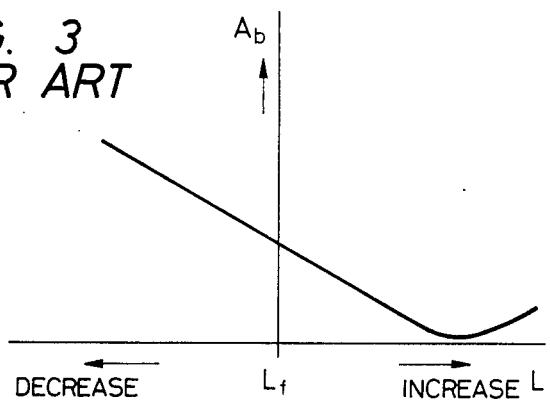
FIG. 3 is a characteristic diagram used for explaining an optical characteristic of the optical pickup device shown in FIG. 2.

This embodiment is so constituted as to correspond substantially to a modification of the optical pickup device shown in FIG. 1, wherein an intermediate lens system 20 is provided in place of the collimating lens system 3. Accordingly, in FIG. 4, elements and parts other than the intermediate lens system 20 and corresponding to those of FIG. 1 are marked with the same references and further description thereof will be omitted.

In the embodiment shown in FIG. 4, the intermediate lens system 20 which is disposed on an optical path between a beam splitter 2 and an objective lens system 4 for guiding a laser light beam emitted from a semiconductor laser 1 and having passed through the beam splitter 2 to the objective lens system 4, is composed of a single plano-convex lens element. The intermediate lens system 20 is so located that a principal plane of the single plano-convex lens element is distant by a distance Lx, which is slightly longer than a focal distance of the single plano-convex lens element, from a light emitting point of the semiconductor laser 1. Accordingly, the laser light beam emitted from the semiconductor laser 1 and having passed through the beam splitter 2 to the intermediate lens system 20 is focused by the intermediate lens system 20 so as to be converged slightly as compared with a parallel light beam as shown imaginarily with a dot and dash line in FIG. 4 to make, for example, a minute angle α in relation to the parallel light beam, and then is caused to enter into the objective lens system 4. The laser light beam is focused by the objective lens system 4 to impinge upon a disc D on which a spiral record track is formed. In such a situation, the laser light beam entering into the objective lens system 4 from the intermediate lens system 20 is converged by the intermediate lens system 20 so slightly as to be focused by the objective lens system 4 in substantially the same manner as a parallel light beam.

As described above, the laser light beam emitted from the semiconductor laser 1 is focused by the intermediate lens system 20, which is so located that a principal plane of the single plano-convex lens element constituting the intermediate lens system 20 is distant by the distance Lx, which is slightly longer than the focal distance of the single plano-convex lens element, from the light emitting point of the semiconductor laser 1, so as to be converged slightly to make the minute angle α in relation to the parallel light beam and then is caused to enter into the objective lens system 4, and thereby, a spherical aberration induced by the intermediate lens system 20 in the light beam passing through the intermediate lens system 20 and the objective system 4 is cancelled at the objective lens system 4. Consequently, a wave front aberration of the light beam impinging upon the disc D is significantly diminished as shown in FIG. 5, even though the intermediate lens system 20 which is composed of the single plano-convex lens element is used.

Figure 5:
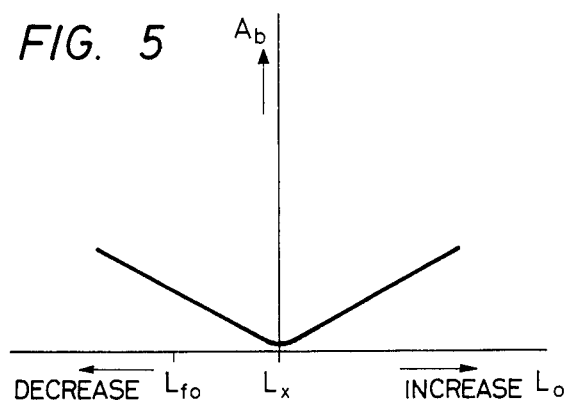
FIG. 5 is a characteristic diagram used for explaining an optical characteristic of the embodiment shown in FIG. 4.

FIG. 5 shows a relationship between the length ($L_0$) of the optical path from the principal plane of the single plano-convex lens element constituting the intermediate lens system 20 to the light emitting point in the semiconductor laser 1 and the wave front aberration (Ab) of the laser light beam at a spot formed on the disc D by the laser light beam, wherein $Lf_0$ represents the focal distance of the single plano-convex lens element. It is understood from the relationship shown in FIG. 5 that when the intermediate lens system 20 is so positioned that the principal plane of the single plano-convex lens element constituting the intermediate lens system 20 is distant by the distance Lx which is slightly longer than the focal distance $Lf_0$ from the light emitting point of the semiconductor laser 1 along the optical path from the principal plane of the single plano-convex lens element to the light emitting point in the semiconductor laser 1, that is, the length ($L_0$) of the optical path is selected to be identical with the distance Lx, the wave front aberration (Ab) of the laser light beam at the spot formed on the disc D by the laser light beam is substantially minimized. That is, when the intermediate lens system 20 is postioned in the manner described above, the wave front aberration (Ab) of the laser light beam which passes through the intermediate lens system 20 and the objective lens system 4 to impinge upon the disc D is sufficiently diminished.

Under the condition described above in connection with FIG. 4, the laser light beam entering into the objective lens system 4 is converged by the intermediate lens system 20 so slightly as to be focused by the objective lens system 4 in substantially the same manner as the parallel light beam, and therefore the fact that the laser light beam converged slightly enters into the objective lens system 4 to be focused thereby exerts substantially no harmful influence upon optical characteristics in an information reading operation.

The laser light beam impinging upon the disc D as described above is modulated in intensity and reflected at the spiral record track formed on the disc D to be a reflected laser light beam. The reflected laser light beam from the disc D passes through the objective lens system 4 and the intermediate lens system 20 to the beam splitter 2 and is deflected at the beam splitter 2 so as to pass to a photodetector 6 through a light receiving lens system 5. Then, detection output signals obtained from the photodetector 6 are supplied to a signal processing circuit (not shown in the drawings) in which a reproduced information signal, focusing control signal and tracking control signal are produced. In this case also, the focus control signal and tracking control signal are supplied to a lens driving unit 7 for focus control and a lens driving unit 8 for tracking control respectively disposed in relation to the objective lens system 4, so that a focus servo control and a tracking servo control are performed.

It is to be understood that the intermediate lens system 20 is not limited to be constituted by such a single plano-convex lens element shown in FIG. 4 and may be constituted by a single biconvex lens element or any other single convex lens element shaped into a different figure.

What is claimed is:

1. An optical pickup device comprising:
  a light beam source,
  objective lens means for focusing a first light beam emitted by said light beam source to cause the same to impinge upon a record medium and for transmitting a reflected light beam coming from the record medium,
  intermediate lens means for causing said first light beam to enter into said objective lens means and for receiving and transmitting said reflected light beam transmitted through said objective lens means, said intermediate lens means being constituted by a single lens element and being operative to converge said first light beam slightly as compared with a collimated light beam so that spherical aberration induced by said intermediate lens means in said first light beam is cancelled at the objective lens means,
  beam splitting means for separating the reflected light beam transmitted through said objective lens means and said intermediate lens means from said first light beam, and
  photodetecting means for detecting the reflected light beam separated by said beam splitting means.

2. An optical pickup device according to claim 1, wherein said intermediate lens means is so positioned in an optical path between said light beam source and said objective lens means that a principal plane of said single lens element is spaced from a light emitting point of said light beam source by a distance slightly longer than a focal distance of said single lens element.

3. An optical pickup device according to claim 2, wherein said intermediate lens means is so positioned that said first light beam is converged by said intermediate lens means so slightly as to be focused by said objective lens means in substantially the same manner as a parallel light beam.

4. An optical pickup device according to claim 1, wherein said single lens element is plano-convex.

* * * * *